United States Patent [19]

Livesay et al.

[11] 4,182,578

[45] Jan. 8, 1980

[54] KEEPER ASSEMBLY

[75] Inventors: Richard E. Livesay; Paul L. Wright, both of Peoria, Ill.

[73] Assignee: Caterpillar Tractor Co., Peoria, Ill.

[21] Appl. No.: 889,702

[22] Filed: Mar. 24, 1978

[51] Int. Cl.$^2$ ............................................. F16B 21/16
[52] U.S. Cl. ................................. 403/317; 403/360; 403/326
[58] Field of Search ................. 403/DIG. 7, 360, 316, 403/261, 326, 317; 85/8.8, 8.9; 74/251 R, 254, 255 R

[56] References Cited

U.S. PATENT DOCUMENTS

| | | | |
|---|---|---|---|
| 2,509,081 | 5/1950 | Bluth | 85/8.8 X |
| 2,595,787 | 5/1952 | Heimann | 85/8.8 |
| 2,861,824 | 11/1958 | Wurzel | |
| 2,894,425 | 7/1959 | Rapata | 85/8.8 |
| 2,897,022 | 7/1959 | Marola | 85/8.8 X |
| 2,989,888 | 6/1961 | Brock | |
| 3,623,530 | 11/1971 | Beyers | 152/410 |
| 4,019,824 | 4/1977 | Percy | 403/360 |

FOREIGN PATENT DOCUMENTS 1405307  5/1965  France ................................... 403/247

*Primary Examiner*—Andrew V. Kundrat
*Attorney, Agent, or Firm*—Charles E. Lanchantin, Jr.

[57] ABSTRACT

A keeper assembly (10) includes a keeper (46) having central axis (18), a pair of end surfaces (48), a planar side surface (60) for receiving force from a first member (32), and a convex side surface (64) facing away from the planar side surface (60) for transferring the force obliquely into a second member (16). The keeper assembly (10) can be used in a track joint (14).

16 Claims, 7 Drawing Figures

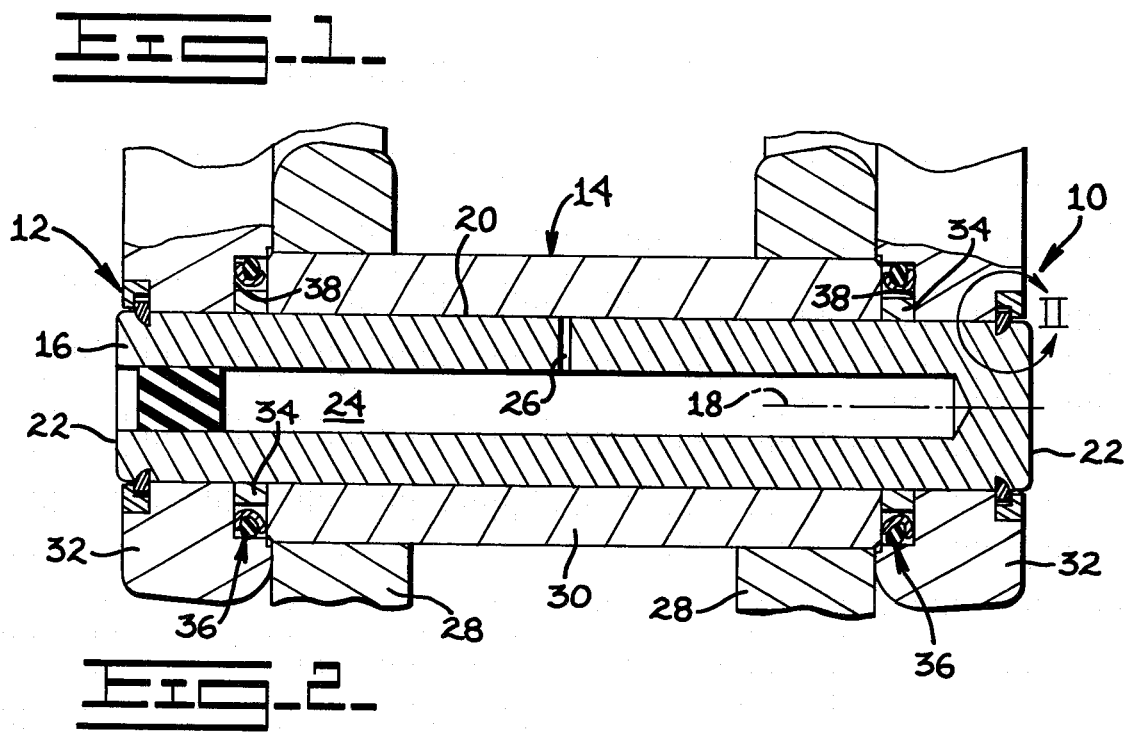
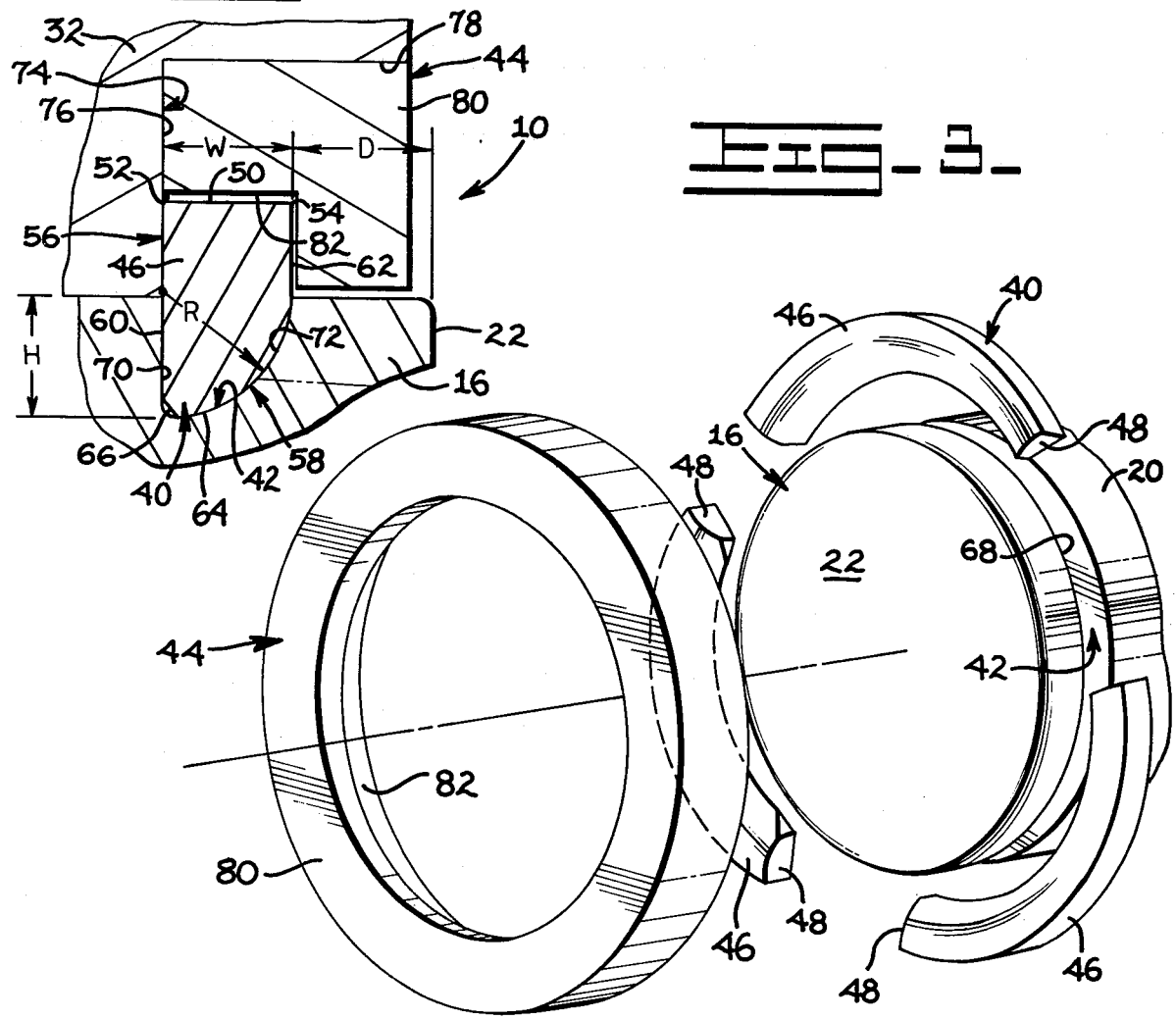

KEEPER ASSEMBLY

TECHNICAL FIELD

The present invention relates to a keeper assembly wherein a replaceable keeper provides a shoulder which functions to secure a first member against axial displacement with respect to a second member.

BACKGROUND ART

It is well known to utilize a C-shaped retaining ring capable of being spread and inserted over the end of a shaft and released into a groove around the shaft. The dimensions of both the retaining ring and the groove in the shaft are dependent upon the allowable working stresses to which the retaining ring is subjected, and it is essential that during spreading of the ring during installation that the stresses thereon do not exceed the elastic limit.

Retaining rings having either a rectangular or circular cross sectional shape are conventionally used by the industry to prevent axial displacement of a bushing, for example, on a cylindrical shaft. Unfortunately, the rings with a circular cross section are seated in relatively shallow semi-circular grooves so that the amount of force that can be resisted is lowered substantially. Furthermore, the leading sharp internal edge of the bushing has a tendency to dig into these round rings so that excess axial movement of the associated members occurs or excess deformation of the ring can result in a failure thereof.

On the other hand, those retaining rings or keepers that have a rectangular cross section provide a more positive shoulder in a plane transverse to the central axis thereof as may be noted by reference to FIG. 5. In the usual construction illustrated by FIG. 5, axial loads are transmitted through the retaining ring to the opposite face of the groove. The root corners of the groove are relatively sharp in order to relatively closely receive the sharp-edged rectangularly sectioned retaining ring. Accordingly, when the forces upon the opposite shoulder or wall of the groove exceed a particular value the stresses rise at the relatively sharp-edged base thereof to the point of failure of the retaining system. Particularly, when it is a necessity that the groove be positioned axially close to the end of the shaft because of space limitations or the like, it has been found that the failure under high loads is in the form of a shear failure of the end of the pin. As shown in FIG. 5, the shear failure is generally along a converging cone outwardly from the axially outer base edge of the groove, as indicated.

In view of the above, it would be advantageous to provide a keeper assembly better able to secure a first member against axial displacement with respect to a second member, and positively able to transmit higher loads without failure.

DISCLOSURE OF INVENTION

The present invention is directed to overcoming one or more of the problems as set forth above.

According to the present invention, this is accomplished by providing a keeper of preselected construction for transferring force from a first member to a second member. Advantageously, the keeper includes a central axis, a pair of end surfaces, a planar side surface located in a plane transverse to the axis for axially receiving force from the first member, and a convex side surface for transferring the force obliquely into the second member.

More specifically, the keeper assembly of the present invention finds particular utility in the environment of a track chain joint in order to retain the track links on the track pins.

BRIEF DESCRIPTION OF THE DRAWINGS

FIG. 1 is a diagrammatic, fragmentary, cross sectional view of a track chain joint illustrating a pair of keeper assemblies constructed in accordance with the present invention.

FIG. 2 is a greatly enlarged fragmentary cross sectional view of the upper right hand keeper assembly illustrated in FIG. 1 to better illustrate details of construction thereof.

FIG. 3 is a fragmentary, diagrammatic, exploded perspective end view of one of the keeper assemblies illustrated in FIGS. 1 and 2.

BEST MODE FOR CARRYING OUT THE INVENTION

Figure 4:
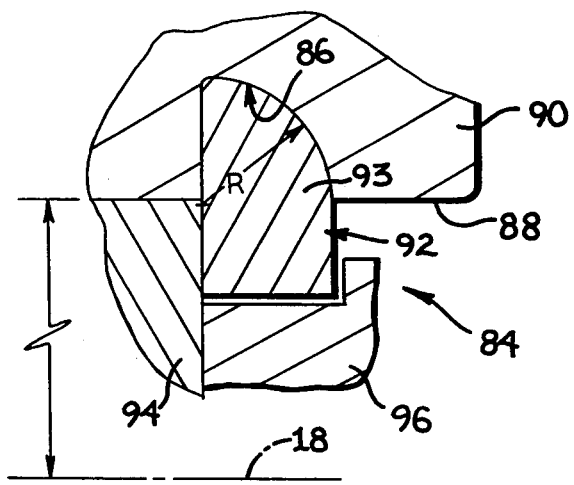
FIG. 4 is a fragmentary cross sectional view of an alternate embodiment keeper assembly constructed in accordance with the present invention, which may be compared with FIG. 2.

In the embodiment of the invention illustrated in FIG. 1, a first keeper assembly 10 and a second identical keeper assembly 12 are shown in connection with the opposite sides of a representative one of a plurality of interconnected endless track chain joints 14. Each of the joints 14 includes a track pin 16 having a central axis 18, a cylindrical outer surface 20 and a pair of opposite end surfaces 22. A lubricant reservoir 24 is formed within the pin and one or more radial passages 26 communicate fluid in the reservoir to the outer surface centrally of the pin. A first pair of track links 28 is mounted as by a press fit on the opposite ends of a hollow cylindrical track bushing 30, and a second pair of track links 32 is mounted as by a press fit on the opposite ends of the track pin. Thus, the bushing and the inner track links 28 are free to rotate centrally on the track pin about the axis 18, while the outer track links 32 are relatively firmly secured to the track pin. A pair of spacer rings 34 serve to transmit axial loads between the bushing and the outer track links and to define the minimum spacing therebetween for axial dimensional control of a pair of end face seal ring assemblies 36 circumscribing the spacer rings and disposed in a respective one of a pair of counterbores 38 in the outer track links. The aforementioned track chain joint construction, including the spacer rings and the seal ring assemblies, for example, but excluding the keeper assemblies 10 and 12, is generally well known in the art.

Referring now to the construction of the first keeper assembly 10, as best illustrated in FIGS. 2 and 3, it may be noted that a keeper means 40 of preselected construction is included and received in groove means 42 in the track pin 16, and retaining means 44 is provided for radially containing the keeper means in place in the groove means.

The keeper means 40 preferably includes a plurality of identical arcuately shaped keepers 46 of preselected construction. In the embodiment illustrated, three arcuate keepers are utilized which are substantially adjacent segments of an interrupted annular ring. Each of these keepers includes a pair of opposite end surfaces 48, and a radially outer cylindrical surface portion 50 spanning substantially between the end surface and having a pair of axially opposite edges 52 and 54 as shown best in FIG. 2. Advantageously, planar side surface means 56 extends radially inwardly from the axially inner edge 52 of the keeper and curved side surface means 58 extends radially inwardly from the axially outer edge 54 of the keeper. The planar side surface means 56 has a planar side surface 60 extending substantially between the end surfaces 48 and located in use in a plane transverse to the central axis 18. In operation, the planar side surface 60 axially receives the force from the track link 32.

The curved side surface means 58, on the other hand, transfers force from the track link 32 obliquely into the track pin 16. The curved side surface means 58 of FIG. 2 preferably includes a second planar side surface 62 extending radially inwardly from the axially outer edge 54 of the keeper 46 in substantially parallel relation to the opposite first planar side surface 60 and defining therewith a preselected axial width "W" of the keeper as indicated on the drawing. But, more importantly, the curved side surface means 58 includes a convex side surface 64 facing away from the side surface 60 and obliquely inwardly toward the central axis 18. This convex side surface is defined by revolving a smoothly curved line located on a plane through the axis about the axis and substantially between the end surfaces 48. Preferably, the curved line is defined as a portion of a circle tangent to the side surface 62 and having a preselected radius "R", and wherein such radius has a length about equal to the axial width "W" of the keeper as can be noted by reference to FIG. 2. Preferably too, the first planar side surface 60 and the convex side surface 64 are connected by a chamfered surface 66 for clearances purposes with respect to the base of the groove means 42.

In the embodiment of FIGS. 2 and 3, the groove means 42 is an annular groove 68 opening radially outwardly on the surface 20 of the pin 16 and extending continuously peripherally around the pin. Preferably, the groove 68 is disposed a preselected axial distance "D" at least as great as the length of the radius "R" or the axial width "W" from the exterior end surface 22 as indicated in FIG. 2. Moreover, the groove in the pin is defined by a planar side wall 70 and a concave side wall 72 connected to each other, and further defining a maximum radial groove depth "H" in section about equal to the radius "R" as shown. In a manner compatible with the cross sectional configuration of the keepers 46, the planar side wall 70 is located in a plane transverse the axis 18 and the concave side wall 72 is preferably defined by revolving a smoothly curved line such as a portion of a circle about the axis. Thus, it is apparent that the keepers and the groove have mating surfaces substantially concentrically arranged with respect to the axis, the mating surfaces defining in cross sectional configuration a pair of substantially juxtaposed transverse straight lines on one side thereof and a pair of juxtaposed curved lines converging toward the pair of straight lines on the other side thereof.

Since the embodiment of FIGS. 1, 2 and 3 has three arcuate keepers 46 for ease of insertion in the groove 68 of the pin 16, the retaining means 44 is utilized to contain the keepers. For this purpose each of the track links has an axially outwardly facing cylindrical counterbore 74 defined by an annular end wall 76 and a cylindrical internal surface 78. The retaining means 44 desirably includes an annular retaining cap 80 having an axially inwardly facing cylindrical counterbore 82, so that when the retaining cap is releasably press fitted fully into the counterbore 74 of the track link the counterbore 82 contains and otherwise restricts movement of the keepers 46 radially outwardly from the groove.

INDUSTRIAL APPLICABILITY

Figure 5:
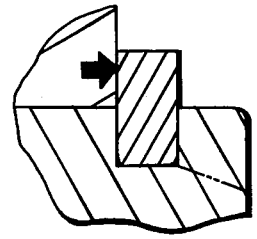
FIG. 5 is a diagrammatic, fragmentary cross sectional view of a retaining ring assembly of the usual type.

A series of experimental tests were run in a laboratory press on the maximum axial retention load and mode of failure of keeper assemblies of various cross sectional configurations disposed in mating grooves, and with the grooves located a preselected distance "D" from the end surface of the pins. The results were as follows:

1. Test of FIG. 5, Keeper Assembly of the usual type: Load at failure—43,500 pounds. Shaft end land abruptly popped off substantially as indicated in broken lines.

Figure 6:
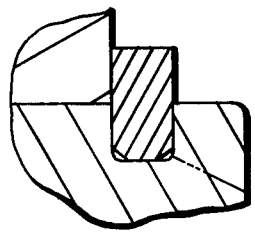
FIG. 6 is a view similar to FIG. 5, only showing a first modification thereof.

2. Test of FIG. 6 (Modification of FIG. 5) Keeper Assembly: Load at failure—58,000 pounds. Same failure mode as above. This modification had a larger or more generous radius at the base edges of the pin groove and larger inner peripheral edge chamfers on the keeper as illustrated.

3. Test of FIG. 7 keeper assembly: Load at failure—87,500 pounds. This construction had a groove with parallel sidewalls and a groove base defined by revolving a semicircular arc around the axis, with the radius "R" thereof being about half radius R of FIG. 2. Basically, the failure mode was similar to the tests of FIG. Nos. 5 and 6 above, only less brittle failure of the pin and the formation of an annular ridge over which the keepers had to move.

4. Test of FIGS. 1-3 keeper assembly: Load at failure—157,000 pounds. Conical shear failure occurred at the end of the pin, only a more muffled or extended failure when compared to the other keeper assemblies. Moreover, upon failure it had a formation of a still larger annular ridge over which any keeper would have to move. Specifically, the shear failure cone was larger and eminated from a point about half-way up the concave side of the groove as indicated by the phantom line in FIG. 2.

Figure 7:
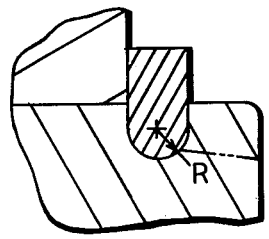
FIG. 7 is a view similar to FIGS. 5 and 6, only showing a second, further advanced modification of the retaining ring assemblies illustrated in FIGS. 5 and 6.

In summary, the load to failure capability of the keeper assembly 10 of the present invention was about an 80% improvement over the second nearest construction represented by FIG. 7. Moreover, the FIG. 7 construction was also a marked and significant improvement over the FIG. Nos. 5 and 6 embodiments.

ALTERNATE EMBODIMENT

An alternate embodiment keeper assembly 84, constructed in accordance with the present invention, is shown in FIG. 4. It differs from the FIG. 1-3 embodiment only in that the geometry of the various elements is reversed relative to the central axis 18 thereof. Specifically, the keeper assembly 84 has groove means 86 opening radially inwardly upon an internal cylindrical surface 88 of an outer member 90, and keeper means 92 including one or more keepers 93 capable of transmitting force from an inner member 94 radially away from the central axis and obliquely outwardly into the end of the outer member. It is clear from FIG. 4, that the keeper means and groove means are merely the reverse of that described above. Furthermore, the retaining means 96 differs only in that it is releasably attached to the inner member 94 and prevents the individual keepers 93 from moving radially inwardly out of the groove means.

While the invention has been described with reference to two embodiments, it will be apparent that variations are possible within the scope of the inventive concepts. For example, it is contemplated that the keeper means 40 may comprise a single C-shaped keeper, not shown, having a cross sectional configuration similar to that described with respect to FIGS. 1 through 3, and which can be expanded or spread by its resiliency over the end of a shaft and released into a mating and corresponding groove around the shaft.

Other aspects, objects and advantages will become apparent from a study of the specification, drawings and appended claims.

The embodiments of the invention in which an exclusive property or privilege is claimed are defined as follows:

1. A keeper (46) for transferring a force from a first member (32) to a second member (16), said keeper (46) having a central axis (18), comprising:
   a pair of oppositie end surfaces (48);
   planar side surface means (56) for axially receiving the force from the first member (32), said planar side surface means (56) including a planar side surface (60) extending substantially between said end surfaces (48), said planar side surface (60) being located in a plane transverse said axis (18); and
   curved side surface means (58) for transferring the force obliquely into the second member (16), said curved side surface means (58) including a convex side surface (64) facing away from said planar side surface (56), said convex side surface (14) being defined by a smoothly curved line revolved about said axis (18) substantially between said end surfaces (48).

2. The keeper (46) of claim 1 wherein said curved line is defined by a portion of a circle having a preselected radius "R".

3. The keeper (46) of claim 2 wherein said keeper (46) has a preselected axial width "W" and said preselected radius "R" has a length about equal to said preselected axial width "W".

4. The keeper (46) of claim 1 wherein said keeper (46) is arcuate and cooperates with at least one other arcuate keeper (46) for substantially simultaneously transferring the force from the first member (32) to the second member (16).

5. The keeper (46) of claim 1 wherein said keeper (46) is one of a plurality of arcuate keepers (46), said plurality of arcuate keepers (46) forming adjacent segments of an interrupted annular ring.

6. The keeper (46) of claim 5 wherein said second member (16) has an annular groove (68) of preselected configuration, said plurality of arcuate keepers (46) being seatable peripherally in said groove (68).

7. The keeper (46) of claim 1 wherein a substantial portion of said convex side surface (64) faces radially inwardly in an oblique direction toward and relative to said axis (18).

8. The keeper (46) of claim 1 wherein said curved side surface means (58) includes a second planar surface (62), said second planar surface (62) being substantially parallel with said first planar side surface (60) and connected to said convex side surface (64).

9. The keeper (46) of claim 1 having a cross sectional configuration defined by a radially outer cylindrical surface portion (50) having opposite edges (52,54), said planar side surface (60) being connected to one of said edges (52,54), a second planar surface (62) being connected to the other of said edges (52,54) and said convex side surface (64) being tangentially connected to said second planar surface (62).

10. The keeper (46) of claim 9 wherein said cross sectional configuration includes a chamfered surface (66) connected between said first planar side surface (60) and said convex side surface (64).

11. In a keeper assembly (10) of the type including a first member (16) having a central axis (18) and an annular groove (68), a second member (32) having a force transmitting surface (76) located in a plane transverse to the axis (18), the improvement comprising:
    said groove (68) having a planar side wall (70) and a concave side wall (72); and
    a plurality of arcuate keeper segments (46) seated in said groove (68) of the first member (16) and having a construction sufficient for axially receiving force from said surface (76) of the second member (32) and transferring said force obliquely relative to said axis (18) and into the first member (16) at said concave side wall (72).

12. The keeper assembly (10) of claim 11 including retaining means (44) for limiting radial movement of said arcuate keeper segments (46) in a direction from said groove (68).

13. The keeper assembly (10) of claim 12 wherein said second member (32) has a cylindrical counterbore (74) and said retaining means (44) includes a cap (80) releasably seated in said counterbore (74).

14. The keeper assembly (10 of claim 11 wherein each of said arcuate keeper segments (46) has a cylindrical outer peripheral surface portion (50), said keeper assembly (10) including a cap (80) having a cylindrical counterbore (82), said cap (80) being releasably connected to one of said first and second members (16,32) such that said counterbore (82) is juxtaposed said outer peripheral surface portions (50) for radially containing said arcuate keeper segments (46).

15. The keeper assembly (10) of claim 11 wherein said groove (68) has a preselected axial width "W" and said concave side wall (72) is formed by revolving a portion of a circle having a radius "R" equal in length to said preselected axial width "W" about said axis (18).

16. The keeper assembly (10) of claim 15 wherein said groove (68) has a preselected maximum radial depth "H" about equal to said radius "R".

* * * * *